United States Patent Office 3,527,798
Patented Sept. 8, 1970

3,527,798
ACTIVE CALCIUM SUCCINATES IN CIS-FORM AND A PROCESS FOR THE PREPARATION THEREOF
Tadataka Hara, 988 4-chome, Shimotakaido, Suginami-ku, Tokyo, Japan
Filed Dec. 12, 1966, Ser. No. 600,949
Claims priority, application Japan, Dec. 16, 1965, 40/77,042
Int. Cl. C07c 55/10
U.S. Cl. 260—537                                3 Claims

ABSTRACT OF THE DISCLOSURE

Active calcium succinates in cis-form and a process for the preparation thereof comprising combining commercial succinic acid with calcium in a molar ratio of at least 2:1. The active calcium succinates possess anticarcinogenic activity and are also useful as deodorants for the removal of fish odor or as refreshing agents for fishes.

---

Figure 1:
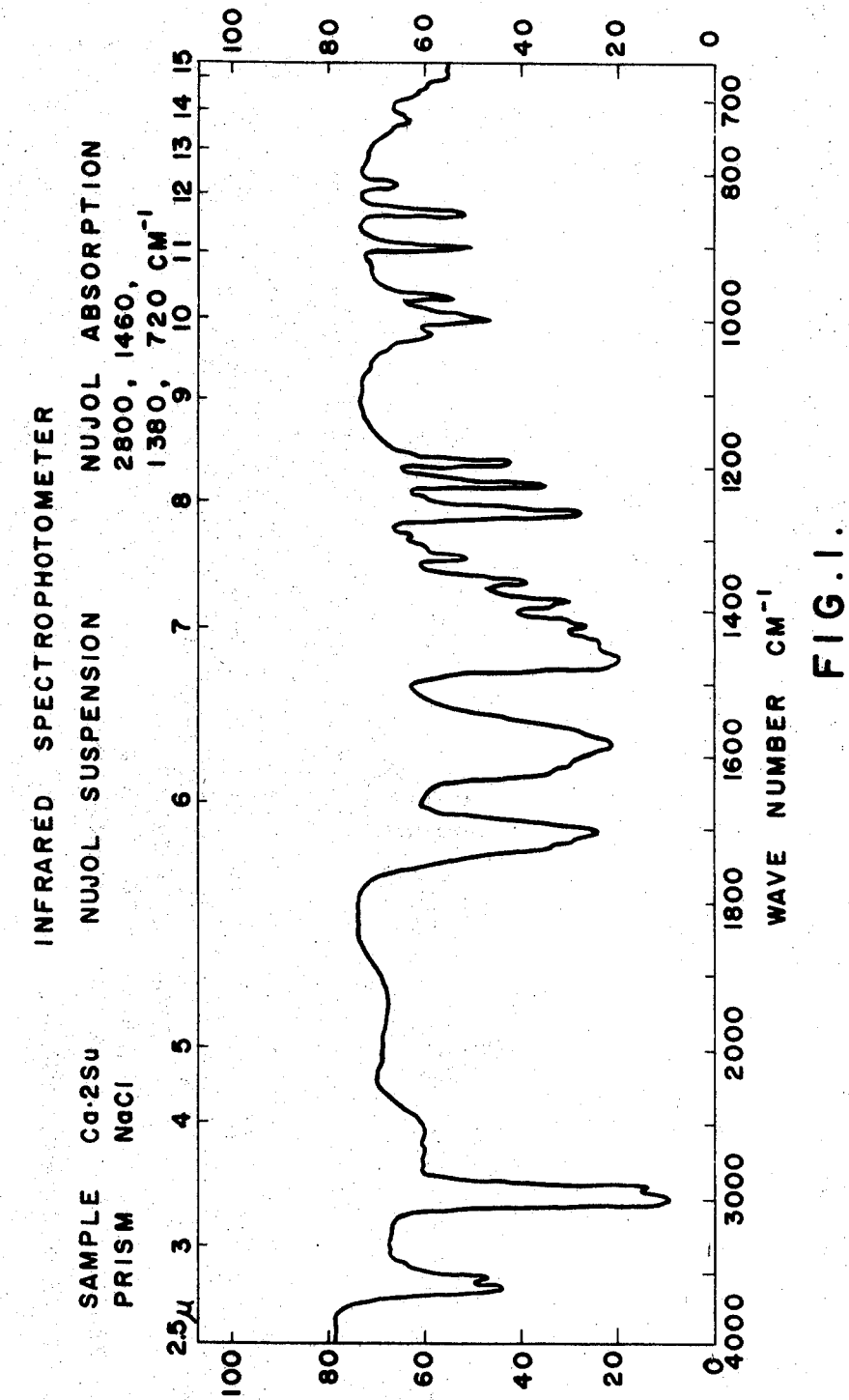
Figure 2:
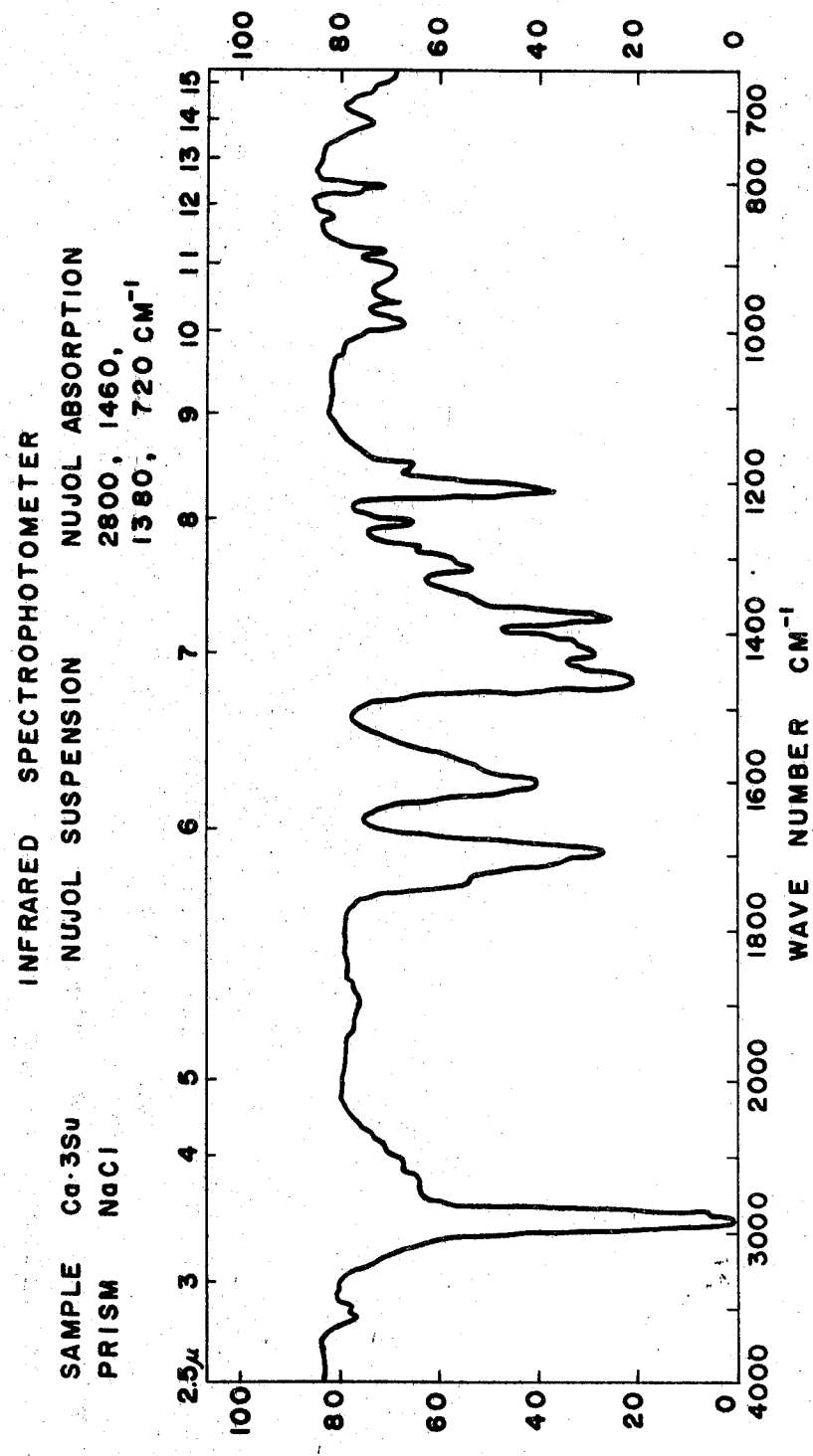
Figure 3:
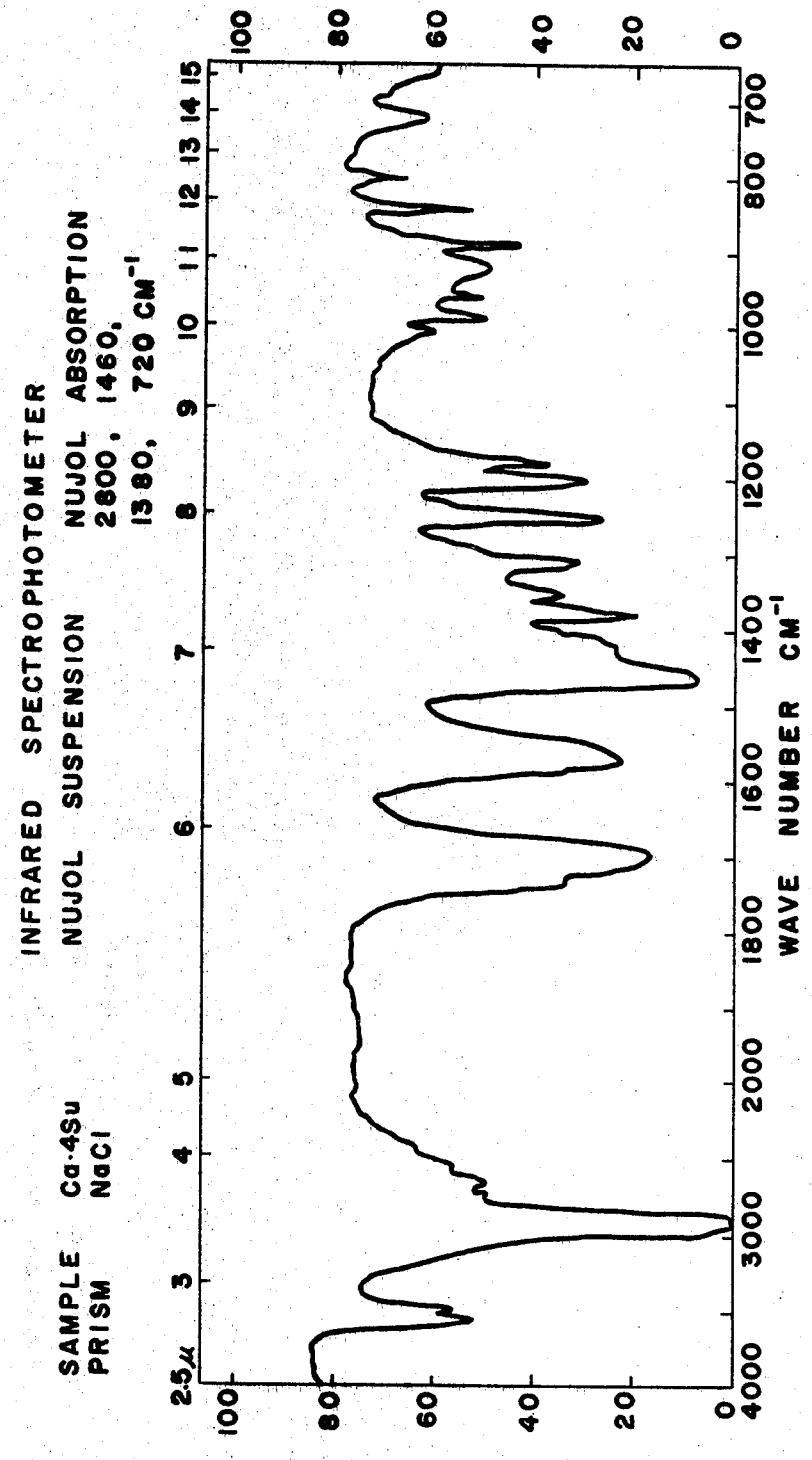
Figure 4:
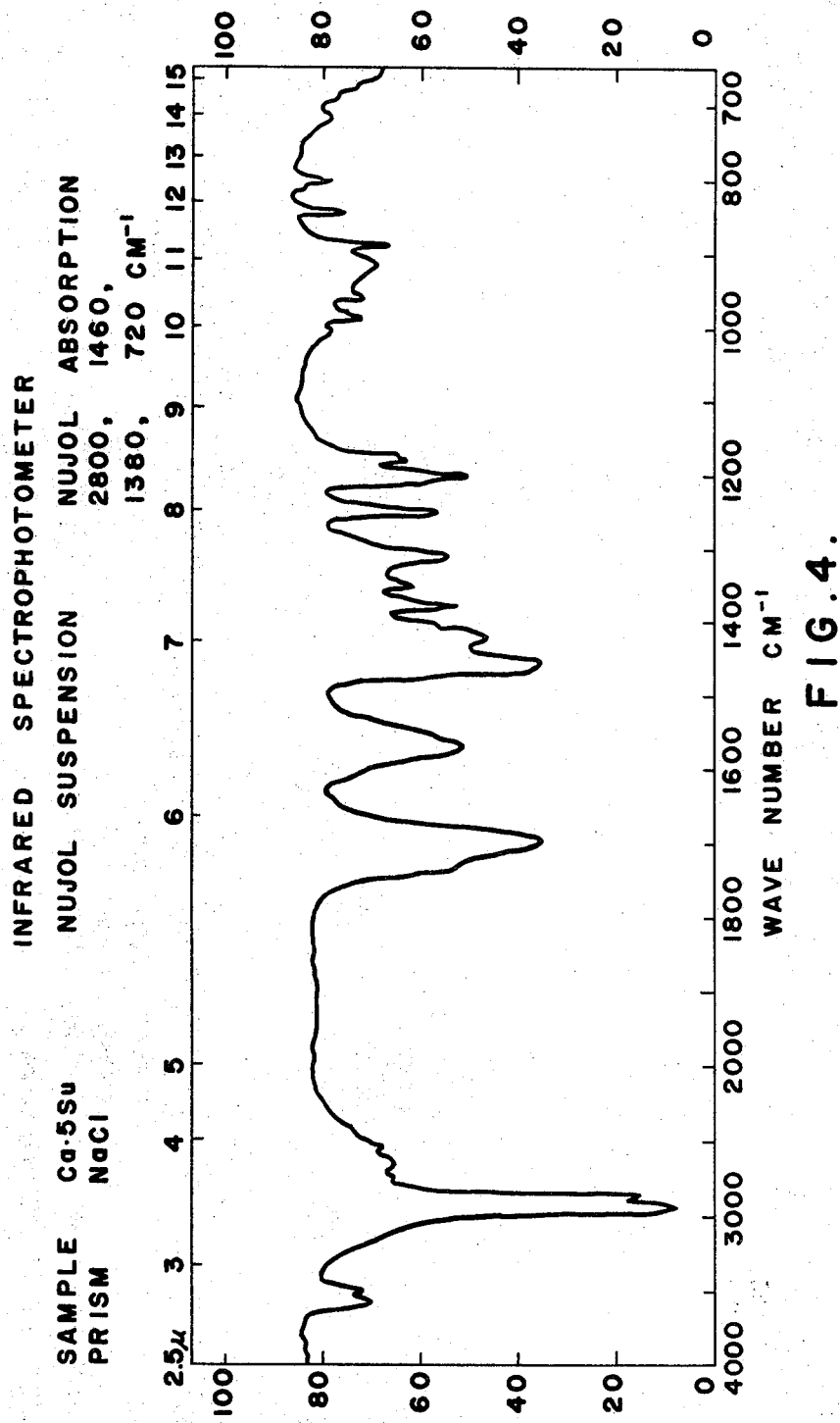

The present invention relates to novel, active calcium succinates in cis-form and to a process for the preparation thereof, and more particularly it relates to the succinates prepared by combining commercial succinic acid with calcium in a molar ratio of at least 2:1 and to the process therefor.

As to processes for preparing active succinic acid in cis form, the present inventor has already been given Japanese Pat. Nos. 310,374, 314,923, 494,465, and 465,057.

The active succinic acid in cis-form obtained by these processes has superior anticarcinogenic activity and is stable in the crystal form, while it is unstable to light and heat in the form of aqueous solution and is eventually denatured if in the form of 1% aqueous solution at a pH above 5.2 whereby it loses its deodorant property and medical effect. Therefore, I have studied to obtain active succinic acid in cis-form which is still stable even if in the form of aqueous solution thereof.

Although the terms "cis-" and "trans-" are generally used to express the structural difference of substances of the same kind having a double bond, we herein use them for the convenience of distinguishing the geometrical isomers of succinic acid having no double bond since no other suitable terms for this purpose are thought of.

According to the present invention, the active calcium succinates in cis-form is prepared by reacting at least two molecules of commercial succinic acid (trans-form) with a molecule of calcium salt. Calcium is a fundamentally divalent element, but in this process it seems to react as a tetra-, hexa-, octa- or deca-valent element.

The conventional calcium succinate is obtained by the reaction as follows:

$$\begin{array}{c} H_2C-COOH \\ | \\ HOOC-CH_2 \end{array} + CaCO_3 \longrightarrow$$

succinic acid (trans-form)    calcium carbinate $$\begin{array}{c} H_2C-COO \\ | \qquad\qquad\; \rangle Ca \\ OOC-CH_2 \end{array} + CO_2 + H_2O$$

calcium succinate (trans-form)    carbon dioxide    water

In the known literatures the structure of calcium succinate is shown as follows:

$$\begin{array}{c} H_2C-COO \\ | \qquad\;\; \searrow \\ \qquad\qquad Ca \\ | \qquad\;\; \nearrow \\ H_2C-COO \end{array}$$

However, the conventional succinic acid is in trans-form, and so it should be expressed as shown in the above reaction formula.

The following reaction is presumed to take place in the process of this invention, and more particularly the following active calcium succinate in cis-form is obtained by dissolving in water one molecule of calcium salt and 2, 3, 4, or 5 molecules of commercial succinic acid and heating the resulting solution to 70° C.–100° C. (preferably 80° C.) for as long a time as possible (preferably 3–6 hours) to liberate one molecule of formaldehyde, one molecule of carbon dioxide and one molecule of water from the acid used.

$$\begin{array}{c} H_2\text{---}H_2 \\ C\text{---}C \\ | \quad | \\ C \quad C \\ O \quad O \\ O \quad O \\ H_2C-COO \diagdown \diagup \text{,}HOOC-CH_2 \\ \qquad\qquad Ca \\ H_2C-COO \diagup \diagdown \text{``}HOOC-CH_2 \end{array}\Big\}_{n-2}$$

wherein n represents an integer of 2, 3, 4, or 5, and dotted line (- - - - -) represents hydrogen bond.

Calcium salts used in such reaction may be calcium carbonate $CaCO_3$, calcium hydroxide $Ca(OH)_2$ or the like.

The formation of these new types of calcium succinate according to the present invention can be proved by the fact that, on washing with alcohol, the succinic acid portion which is bound by only hydrogen bond is eluted from the active calcium succinate, but the amount of the eluate corresponds to (molecular weight of succinic acid) $(n-2)$.

For brevity, the conventional and the novel calcium succinates are hereinafter shown as follows:

Commercial calcium succinate—Ca.Su
Calcium disuccinate—Ca.2Su
Calcium trisuccinate—Ca.3Su
Calcium tetrasuccinate—Ca.4Su
Calcium pentasuccinate—Ca.5Su Melting points, sublimation temperatures, pH values of 1% aqueous solution and solubilities in water of the above succinates are as follows:

|            | M.P. (°C.) | Subl. temp. (° C.) | pH (1% solution) | Solubility (water) |
|------------|-----------|--------------------|-----------------|--------------------|
| Ca.Su      | [1] 310   |                    | 5.79            | Extremely low.     |
| Ca.2Su     | 180       | [2] 135            | 4.8             | 1 g.:10 ml.        |
| Ca.3Su     | 180       | 135                | 4.4             | 7                  |
| Ca.4Su     | 175       | 135                | 4.2             | 5.                 |
| Ca.5Su     | 175       | 135                | 4.2             | 5.                 |

[1] Decomp.
[2] A small amount.

Figure 5:
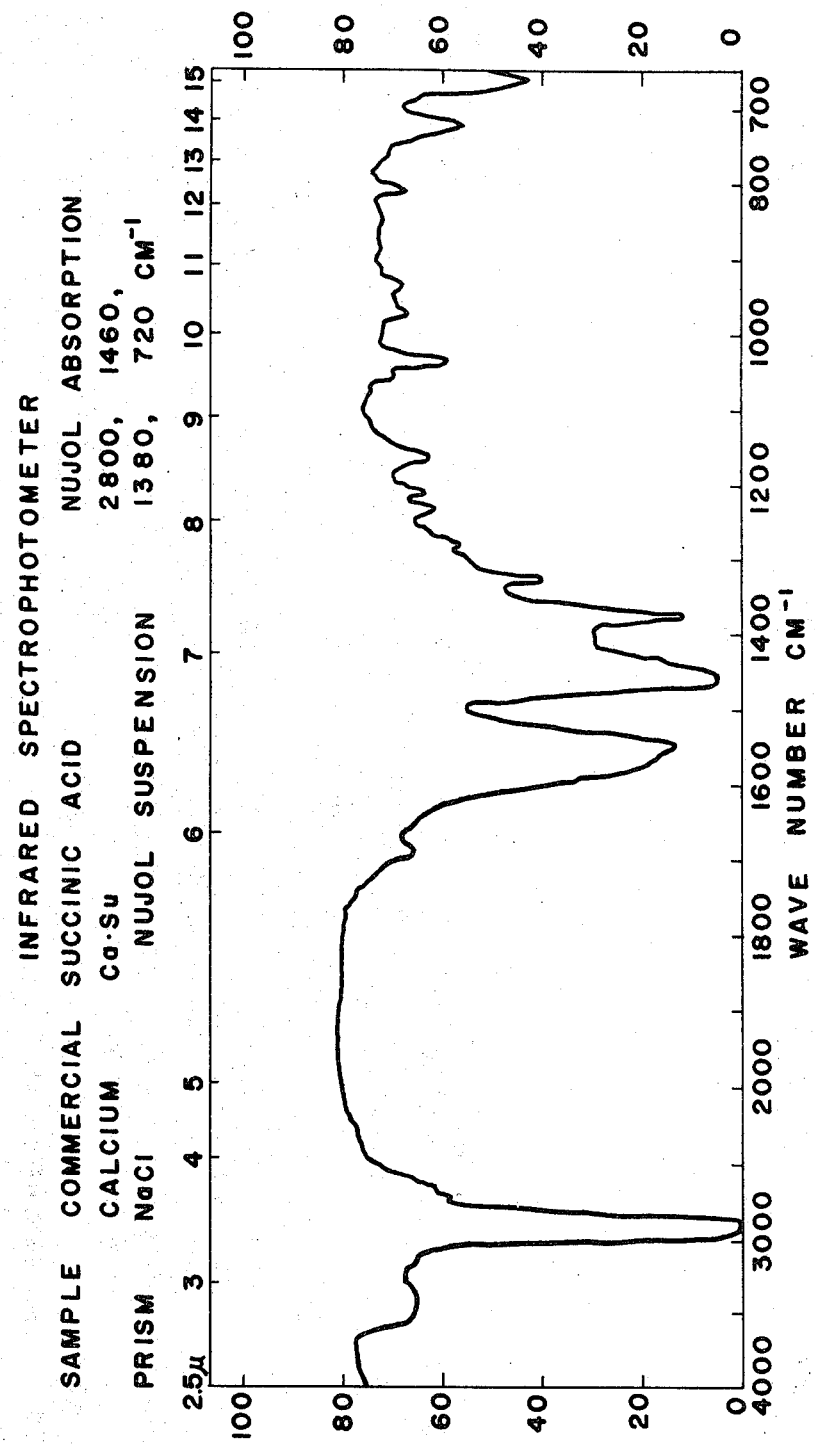
Figure 6:
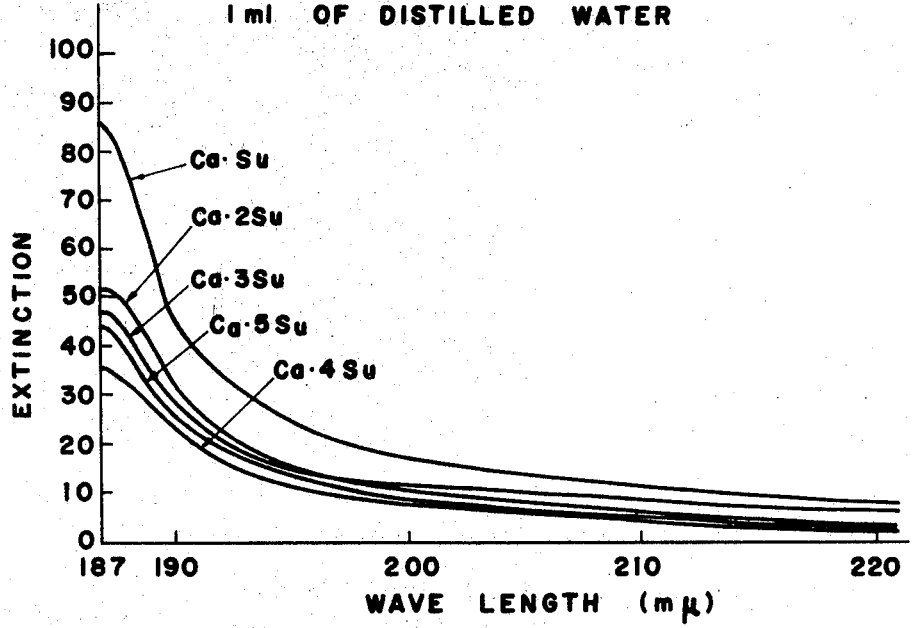

FIGS. 1 to 4 show infrared absorption spectra of active calcium succinates in cis-form, FIG. 5 shows infrared absorption spectra of commercial calcium succinate (trans-form), and FIG. 6 shows ultraviolet absorption spectra of active calcium succinates in cis-form and commercial calcium succinate.

Infrared absorption spectra of the above succinates were determined with a Hitachi Infrared spectrophotometer.

Common absorptions of the products of this invention were at 3,500, 1,700, 1,570, 1,300–1,200 and 1,000–90 cm.$^{-1}$ (FIGS. 1–4). However, as shown in FIG. 5, absorptions of Ca.Su were not at 3,500 and 1,700 (carboxyl group) but 1,545 cm.$^{-1}$, and the absorptions at 1,300–1,200 and 1,000–900 cm.$^{-1}$ were very weak. From these results, the Ca.Su was presumed to be in transform. Each example was suspended in Nujol.

Ultraviolet absorptions were determined with a self-recording spectrophotometer made by Hitachi Co. The results are shown in FIG. 6. A sample of each of said succinates was weighed precisely with Mettler (micro balance) and dissolved in distilled water to obtain an aqueous solution with the concentration of 40 γ/ml. Determination was initiated at wave length of 187 mμ and continued at greater wave lengths, no peak appearing during the determination. It was found that the higher the absorbancy of a sample at 187 m$\mu$ is, the less the anticarcinogenic effect of the sample is (the samples have each the same concentration), which agrees with the correlation of ultraviolet absorbancy and the anticarcinogenic effect as shown in Japanese Pat. No. 465,057 (process for preparing new cis-succinic acid) given to the inventor.

Ehrlich anticarcinogenic test for mouse abdominal cancer is stated below.

Mice which were of ddN series and weighing 20±1 g. each, were used in the tests irrespective of sex. Each of groups comprised 10 mice, and three groups were used in each of the tests made on the succinates and the control which is hereinafter mentioned. The following was the procedure of the tests. Cancer cells were obtained from the mice 10 days after the transplantation therein, and suspended in saline solution. About 4 millions of the cells were transplanted into the abdomen of each of the animals, and 250 mg. (about 0.5 ml.) of 1% aqueous solution of the test compound (without adjusting pH value) per kg. of body weight were daily injected into the same abdomen over a period of 10 days, 48 hours after the transplantation of the cancer cells. Observation of these tests was continued for 50 days after this transplantation. The anticarcinogenic effect of each of the succinates was determined from mean survival time and percentage of the mice which survived for 50 days. Mice which died during the test were anatomized to confirm the causes of their death.

Mean values of the results obtained by the three tests made on each of the succinates, and on physiological salt solution which was injected to each mouse of the control group in amount of 0.5 ml. per kg. of body weight are shown below.

|  | Mean survival time (day) | Mean longest period of time during which all members of group had been alive after the start of the test (day) | Mean survival rate 50 days after the start of the test (percent) |
|---|---|---|---|
| Control | 14.5 | 11 | 0 |
| Ca.Su | 17.0 | 11 | 0 |
| Ca.2Su | (*) | 25 | 28 |
| Ca.3Su | (*) | 35 | 71 |
| Ca.4Su | (*) | 47 | 96 |
| Ca.5Su | (*) | 41 | 88 |

*Mean survival time could not be calculated because there were some mice which were still alive after the completion of the 50 days' test.

EXAMPLE

One hundred and eighteen grams of commercial succinic acid (molecular weight: 118) and 25 g. of calcium carbonate (molecular weight: 100) are weighed out and then dissolved in 600 ml. of distilled water at an ambient temperature. The solution is filtered through a filter paper. After allowing to stand for 24 hours, the filtrate is heated gradually to 100° C. Then the water is evaporated from the filtrate as slowly as possible at 100° C. under stirring to form crystals. The crystallization begins about 3 hours after and ends about 6 hours after the initiation of the heating of the filtrate, when the evaporation of the water is completed. The collected crystals are then dried in a dryer for 24 hours. The crystals weigh about 129 g.

The cis-calcium succinates thus obtained are stable in the form of aqueous solution, and are not denatured by light or heat. The cis-calcium succinates may be widely used as medicines (anticarcinogen, blood pressure lowering agent, agent for regulating aliphatic acid metabolism, de-anesthesiant, agent for lowering hyper blood sugar content, antiviral agent, antiallergenic agent, cardiac tonic, diuretic drug, breath-recovering agent, etc.), as deodorants (fishy odor, odor of whale, odor of excrements, etc.) or as refreshing agents for fishes.

What I claim is:

1. A process for the preparation of calcium succinates in cis-form characterized by dissolving calcium carbonate and from two to five moles of trans succinic acid per mole of calcium carbonate in water to form a solution, heating said solution at a temperature of from 70° C. to 100° C. for a sufficient time to liberate formaldehyde, carbon dioxide and water from said solution, and recovering calcium succinates in cis-form.

2. A process according to claim 1 wherein said solution is heated for from three to six hours.

3. Active calcium succinates in cis-form obtained by the process as claimed in claim 1.

References Cited

Johnston, C. A. 50:8362 (1956).
Schubert, C. A. 46:7400 (1942).
Schubert et al., J.A.C.S., July 20, 1962, pp. 3529–3532.

LORRAINE A. WEINBERGER, Primary Examiner

V. GARNER, Assistant Examiner

U.S. Cl. X.R.

260—601, 999; 424—76, 317